United States Patent Office 2,948,585
Patented Aug. 9, 1960

2,948,585

PROCESS FOR APPLYING PEST CONTROL SUBSTANCES TO SEEDS

Maurice Fitzgibbon, 9 Haverbreaks Place, Lancaster, Lancashire, England

No Drawing. Filed Sept. 6, 1956, Ser. No. 608,181

Claims priority, application Great Britain Sept. 6, 1955

5 Claims. (Cl. 21—57)

This invention comprises an improved process for applying pest control substances to seeds.

In most countries where cereals are grown it is usual to treat the seed grains of wheat, oats, barley, rye and other plants with a fungicidal disinfectant powder before sowing to destroy or inhibit germination of the spores of various fungi which may be present on the surface of the seeds and cause disease in the crops.

The fungicidal powders which are most extensively used comprise a powdered inert mineral, such as talc, together with a fungicide, usually an organo mercury compound. Ethyl mercuric chloride and phenyl mercuric acetate are examples of organo mercury compounds which are effective active ingredients in such fungicidal powder disinfectants.

Sometimes it is desired to treat cereal grains intended for sowing with an insecticide to prevent damage by soil inhabiting pests, in particular wireworms (*Agrostis ypsilon*). Treatment of the seed to prevent fungus disease and insect damage is accomplished by applying a fungicidal and insecticidal powder comprising a powdered inert mineral such as talc, together with an organo mercury compound such as ethyl mercuric chloride and/or phenyl mercuric acetate and a synthetic insecticide such as the gamma isomer of 1,2,3,4,5,6-hexachlorocyclohexane.

Cereal grains may be protected during storage from infestation with destructive insects such as grain weevils (*Calandra granaria*) saw-toothed grain beetles (*Oryzaephilus surinamensis*) confused flour beetles (*Tribolium confusus*) flour mites (*Tyroglyphus farinae*) and larvae of the cocoa moth (*Ephesta elutella*) and others, by treating with insecticidal powders comprising a powdered inert mineral such as talc, together with an insecticide of either natural or synthetic origin such as pyrethrum or the gamma isomer of 1,2,3,4,5,6-hexachlorocyclohexane.

The economic benefit derived from the treatment of seed with dry powders for the purpose of controlling fungus diseases or insects, or for both purposes together, is so great that the hazard to health associated with an excess of fine powder adhering to the grains is tolerated. It is apparent that any dry powdered mineral which may be the vehicle for a fungicide or an insecticide applied to cereal grains or other plant seeds, must become detached to a considerable extent from the surface of the seeds during subsequent movement and thus be available for contamination of the atmosphere in granaries, warehouses, and other enclosed places and of material objects such as bags used for containing the treated seed. To reduce the possible hazard and annoyance associated with the use of dust-like specifics for seed treatment, attempts have been made to apply the active ingredients in liquid form by spraying solutions or dispersions in water of fungicides or insecticides, or suspensions in water of fungicides and insecticides with powdered inert minerals.

The spraying of liquids has certain disadvantages and is not generally preferred to the treatment of seeds with dry powders. With aqueous sprays it is difficult to attain satisfactory distribution on the grain surfaces of the active pest-controlling ingredient without increasing undesirably the moisture content of the seed. When suspensions in water of active ingredients with powdered minerals are applied and the seed grain re-dried, the hazard from dust is comparable with grain treated directly with powder.

The object of the present invention is to provide a process for the treatment of seeds, i.e. seed grain, cereal seed and other seed, which will not have the aforesaid disadvantages.

This object is achieved, according to the invention, by depositing on the seeds a pest control substance as a condensate together with water from a mixture of vapour of the substance and water vapour. The term "pest control substance" is here and hereinafter used to denote one or more fungicides and/or one or more insecticides which are such as will volatilise together with water vapour when heated with water. Examples are the fungicidal and insecticidal agents hereinbefore mentioned.

The amount of water together with the pest control substance deposited on the seed may vary but will always be small and will preferably not exceed 0.5% of the weight of the seed. Such a small amount is absorbed rapidly by the superficies of the seed grains and is not objectionable.

There will be no injury to the normal biological development of the plant from seed treated by the process.

The vapour mixture may be produced by heating the pest control substance together with water, preferably to boiling temperature. The heating may be effected upon a predetermined volume of water, e.g. a gallon, containing the substance whilst maintaining said volume by continual replacement of what is evaporated. The heat supply may be regulated to maintain the water in steady ebullition such that the change from liquid to vapour phase will be at a substantially constant rate.

Alternatively the vapour mixture may be produced by heating the pest control substance in a stream of water vapour or of water vapour and air.

As a further alternative the pest control substance may be separately vapourised at a temperature not less than the boiling point of water and the vapour thereof then entrained in a stream of water vapour.

In addition to the pest control substance and water there may be present any further substance, e.g. a plant growth regulating substance or a surface tension modifying substance, which it may be desired to condense or deposit upon the surface of the seed.

What I claim is:

1. Process for applying to seeds a pest control substance volatile in steam comprising forming a mixture of the substance in vapor form with water vapor, and condensing both the substance vapor and the water vapor on the seeds.

2. Process according to claim 1 in which the vapour mixture is produced by heating the substance together with water.

3. Process according to claim 1 in which the vapour mixture is produced by heating a predetermined volume of water containing the substance whilst maintaining said volume by continual replacement of the quantity evaporated.

4. Process according to claim 1 in which the vapour mixture is produced by heating the pest control substance in a stream of water vapour which may also contain air.

5. Process according to claim 1 in which the pest control substance is separately vapourised at a temperature not less than the boiling point of water and the vapour thereof is then entrained in a stream of water vapour.

References Cited in the file of this patent
UNITED STATES PATENTS

| | | |
|---|---|---|
| 905,609 | Walker | Dec. 1, 1908 |
| 906,098 | Bloch | Dec. 8, 1908 |
| 1,375,529 | Minne | Apr. 19, 1921 |
| 1,723,955 | Shepherd et al. | Aug. 6, 1929 |
| 1,752,424 | Engelmann | Apr. 1, 1930 |
| 2,285,950 | Sullivan et al. | June 9, 1942 |
| 2,416,256 | Hochberg | Feb. 18, 1947 |
| 2,731,770 | Rhea | Jan. 24, 1956 |